(12) United States Patent
Mori et al.

(10) Patent No.: US 10,414,129 B2
(45) Date of Patent: Sep. 17, 2019

(54) INTERLAYER FOR LAMINATED GLASS AND LAMINATED GLASS

(71) Applicant: SEKISUI CHEMICAL CO., LTD., Osaka (JP)

(72) Inventors: Michiko Mori, Shiga (JP); Hiroshi Kawate, Shiga (JP); Etsurou Hirota, Shiga (JP); Koji Kido, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 99 days.

(21) Appl. No.: 15/562,033

(22) PCT Filed: Apr. 7, 2016

(86) PCT No.: PCT/JP2016/061456
§ 371 (c)(1),
(2) Date: Sep. 27, 2017

(87) PCT Pub. No.: WO2016/163486
PCT Pub. Date: Oct. 13, 2016

(65) Prior Publication Data
US 2018/0104934 A1    Apr. 19, 2018

(30) Foreign Application Priority Data
Apr. 8, 2015    (JP) .................. 2015-079355

(51) Int. Cl.
*B32B 17/06* (2006.01)
*B32B 17/10* (2006.01)
(Continued)

(52) U.S. Cl.
CPC .......... *B32B 17/10651* (2013.01); *B32B 3/30* (2013.01); *B32B 17/06* (2013.01);
(Continued)

(58) Field of Classification Search
None
See application file for complete search history.

(56) References Cited

U.S. PATENT DOCUMENTS 4,671,913 A * 6/1987 Gen .................. B29C 43/222
264/173.18
5,487,939 A * 1/1996 Phillips ............ B32B 17/10036
156/230

(Continued)

FOREIGN PATENT DOCUMENTS

EP    0 173 337    3/1986
JP    8-26789    1/1996
(Continued)

OTHER PUBLICATIONS

TESA Technology, "Surface Roughness Testing", 2018, product brochure (Year: 2018).*

(Continued)

*Primary Examiner* — Seth Dumbris
*Assistant Examiner* — Kim S. Horger
(74) *Attorney, Agent, or Firm* — Wenderoth, Lind & Ponack, L.L.P.

(57) ABSTRACT

The present invention aims to provide an interlayer film for a laminated glass, which includes two or more stacked resin layers including a colored layer, exhibits excellent deaeration properties in a production process of a laminated glass, and is capable of preventing poor appearance of a colored portion, and a laminated glass including the interlayer film for a laminated glass. The present invention relates to an interlayer film for a laminated glass, having a laminated structure including two or more layers, at least including: an outer layer disposed on the outermost surface of the interlayer film for a laminated glass and having a large number of recesses on one surface; and a colored layer containing a colorant, a minimum distance between an outer layer side (Continued)

surface of the colored layer and the surface having a large number of recesses of the outer layer being 150 μm or longer.

7 Claims, 2 Drawing Sheets

(51) Int. Cl.
  *B32B 3/30* (2006.01)
  *B60J 1/00* (2006.01)
  *B60J 3/00* (2006.01)

(52) U.S. Cl.
  CPC .. *B32B 17/10357* (2013.01); *B32B 17/10577* (2013.01); *B32B 17/10587* (2013.01); *B32B 17/10596* (2013.01); *B60J 1/00* (2013.01); *B60J 3/007* (2013.01)

(56) References Cited

U.S. PATENT DOCUMENTS

| | | | | |
|---|---|---|---|---|
| 8,012,612 | B2 * | 9/2011 | Hasegawa | B32B 17/10339 428/432 |
| 2010/0043946 | A1 | 2/2010 | Ogino et al. | |
| 2012/0135191 | A1 * | 5/2012 | Spangler | B29C 59/04 428/141 |
| 2014/0302281 | A1 * | 10/2014 | Yacovone | C08F 116/06 428/141 |
| 2016/0129674 | A1 * | 5/2016 | Kitano | B32B 17/10761 428/141 |

FOREIGN PATENT DOCUMENTS

| | | |
|---|---|---|
| JP | 2003-221261 | 8/2003 |
| JP | 2007-55822 | 3/2007 |
| JP | 2007-331959 | 12/2007 |
| JP | 2013-6729 | 1/2013 |
| WO | 03/074270 | 9/2003 |
| WO | 2009/001856 | 12/2008 |
| WO | 2012/074702 | 6/2012 |
| WO | 2014/168793 | 10/2014 |
| WO | 2015/016366 | 2/2015 |

OTHER PUBLICATIONS

International Search Report dated Jul. 12, 2016 in International (PCT) Application No. PCT/JP2016/061456.
Extended European Search Report dated Nov. 23, 2018 in European Application No. 16776652.6.

* cited by examiner (a)

(b)

INTERLAYER FOR LAMINATED GLASS AND LAMINATED GLASS

TECHNICAL FIELD

The present invention relates to an interlayer film for a laminated glass, which includes two or more stacked resin layers including a colored layer, exhibits excellent deaeration properties in a production process of a laminated glass, and is capable of preventing poor appearance of a colored portion, and a laminated glass including the interlayer film for a laminated glass.

BACKGROUND ART

A laminated glass including two glass plates bonded to each other with an interlayer film for a laminated glass containing a thermoplastic resin in between is widely used for glass windows of automobiles, aircraft, or buildings, for example.

An interlayer film for a laminated glass may include only one resin layer or may be a laminate including two or more resin layers. Including a first resin layer and a second resin layer which have different properties from each other as two or more resin layers, an interlayer film for a laminated glass can have various properties hardly achieved by a monolayer structure.

Patent Literature 1, for example, discloses a three-layer sound insulation interlayer film for a laminated glass which includes a sound insulation layer and two protective layers interposing the sound insulation layer therebetween. The interlayer film for a laminated glass disclosed in Patent Literature 1 includes a sound insulation layer containing a polyvinyl acetal resin that is highly compatible with a plasticizer and a large amount of a plasticizer to exhibit excellent sound insulation properties. The protective layers prevent bleed-out of a large amount of the plasticizer contained in the sound insulation layer to prevent lowering of adhesiveness between the interlayer film and glass plates.

Patent Literature 2 discloses an interlayer film for a laminated glass which includes a belt-like colored layer along the upper portion of a laminated glass for a vehicle. Such a colored layer prevents sunlight from coming into sight of the driver, providing high anti-glare properties.

However, in the case of disposing a colored layer in a multilayered interlayer film for a laminated glass, linear color unevenness can occur in the colored portion which causes poor appearance. Such poor appearance is especially noticeable in cases where a colored layer is disposed in an interlayer film for a laminated glass excellent in sound insulation properties such as an interlayer film disclosed in Patent Literature 1.

CITATION LIST

Patent Literature

Patent Literature 1: JP 2007-331959 A
Patent Literature 2: WO 2009/001856

SUMMARY OF INVENTION

Technical Problem

The inventors have studied the causes of poor appearance in the case of using an interlayer film for a laminated glass in which two or more resin layers including a colored layer are stacked. The inventors have then found that recesses formed in the surface of an interlayer film for a laminated glass are one of the causes.

In common production of a laminated glass, a laminate including at least an interlayer film for a laminated glass interposed between two glass plates are passed through nip rolls for deaeration (squeeze deaeration) or put in a rubber bag and vacuum suctioned (vacuum deaeration) to be pressure-bonded while the air remaining between the glass plates and the interlayer film is removed. The resulting laminate is pressurized with heat, for example, in an autoclave so as to be pressure-bonded. A laminated glass is produced in this manner. In production of a laminated glass, deaeration properties are important in stacking of glass plates and an interlayer film for a laminated glass. The interlayer film for a laminated glass has fine protrusions and recesses formed on at least one surface for the purpose of ensuring deaeration properties in production of a laminated glass. In particular, when recesses among the protrusions and recesses have a groove shape with a continuous bottom (hereafter, also referred to as a "shape of an engraved line") and such recesses in the shape of engraved lines are regularly formed to be adjacently arranged parallel to each other, the deaeration properties achieved are significantly excellent.

Recesses formed on the surface of the interlayer film for a laminated glass are commonly crushed upon pressure bonding in production of a laminated glass. They therefore have hardly caused troubles in the obtained laminated glass.

However, the inventors found that, in the case of an interlayer film for a laminated glass in which two or more resin layers including a colored layer are stacked on each other, influence of the recesses remains in the colored layer of the laminated glass obtained through the production process thereof to cause poor appearance.

Specifically, in the case where recesses are formed on the surface of an interlayer film for a laminated glass which includes two or more stacked resin layers including a colored layer with an embossing roll, for example, recesses are not only formed on the surface of the interlayer film but also transferred to the interface of the resin layers by a pressure applied during the embossing treatment, so that the interface is not smooth any more. Especially, when recesses in the shape of engraved lines are formed on the surface, the recesses are presumably also transferred strongly to the interface of the layers. Though recesses on the surface of the interlayer film are crushed upon pressure bonding in the production process of a laminated glass, protrusions and recesses transferred to the interface of the resin layers are left. Those protrusions and recesses left in the interface of the resin layers are hardly noticeable by the naked eye in a transparent portion, but are perceived as linear color unevenness in a colored portion, causing poor appearance. In particular, an interlayer film for a laminated glass excellent in sound insulation properties, such as one described in Patent Literature 1, is especially likely to have such poor appearance because in formation of recesses on a hard protective layer thereof, protrusions and recesses are likely to be transferred to a colored layer disposed between the protective layer and the sound insulation layer which is soft.

Poor appearance can be prevented by eliminating formation of recesses on the surface of an interlayer film for a laminated glass. However, without formation of recesses, deaeration in production of a laminated glass may be insufficient to generate air bubbles between glass plates and an interlayer film, eventually spoiling the appearance of the laminated glass.

The present invention aims to, in consideration of the state of the art, provide an interlayer film for a laminated glass which includes two or more stacked resin layers including a colored layer, exhibits excellent deaeration properties in a production process of a laminated glass, and is capable of preventing poor appearance of a colored portion, and a laminated glass including the interlayer film for a laminated glass.

Solution to Problem

The present invention provides an interlayer film for a laminated glass, having a laminated structure including two or more layers, at least including: an outer layer disposed on the outermost surface of the interlayer film for a laminated glass and having a large number of recesses on one surface; and a colored layer containing a colorant, a minimum distance between an outer layer side surface of the colored layer and the surface having a large number of recesses of the outer layer being 150 μm or longer.

The present invention is specifically described in the following.

The inventors have found, as a result of investigation, that with at least a certain distance between recesses on a surface of an outer layer disposed on the outermost surface of an interlayer film for a laminated glass and the surface of a colored layer, even an interlayer film for a laminated glass which includes two or more stacked resin layers including a colored layer can achieve both excellent deaeration properties in production of a laminated glass and prevention of poor appearance. The inventors have thereby arrived at the present invention.

The interlayer film for a laminated glass of the present invention has a laminated structure including two or more layers including an outer layer disposed on the outermost surface of the interlayer film for a laminated glass and a colored layer containing a colorant. With this structure, excellent deaeration properties in production of a laminated glass and anti-glare properties can be achieved.

The outer layer has a large number of recesses on one surface. With this structure, deaeration properties in production of a laminated glass can be ensured.

The shape of the recesses is at least a groove shape, and may be any shape commonly employed for recesses formed on the surface of an interlayer film for a laminated glass, such as a shape of engraved lines or a lattice. The shape of the recesses may be a shape of an embossing roll.

In particular, the recesses preferably have a groove shape with a continuous bottom (shape of an engraved line) and are arranged adjacently parallel to each other. Commonly, ease of deaeration upon pressure bonding of a laminate including an interlayer film for a laminated glass interposed between two glass plates closely relates to the continuousness and smoothness of the bottoms of the recesses. When the recesses on one surface of the outer layer are in the shape of engraved lines arranged parallel to each other, the continuousness of the bottoms is further improved to markedly increase the deaeration properties.

FIGS. 1 and 2 are views each schematically illustrating an exemplary interlayer film for a laminated glass including an outer layer on which recesses in the shape of engraved lines are formed parallel to each other at equal intervals.

FIG. 3 is a view schematically illustrating an exemplary interlayer film for a laminated glass in which recesses in the shape of engraved lines are formed parallel to each other at unequal intervals. In FIG. 3, an interval A between recess 1 and recess 2 and an interval B between the recess 1 and recess 3 are different from each other.

The lower limit of the ten-point average roughness (Rz) of the surface having a large number of recesses of the outer layer as measured in conformity with JIS B 0601 (1994) is preferably 15 μm, and the upper limit thereof is preferably 60 μm. With the ten-point average roughness within the above range, excellent deaeration properties can be achieved in production of a laminated glass. The lower limit of the ten-point average roughness Rz is more preferably 25 μm, and the upper limit thereof is more preferably 45 μm.

A large number of recesses are formed on one surface of the outer layer in the interlayer film for a laminated glass of the present invention by, for example, an embossing roll method, a calender roll method, or a profile extrusion method. In particular, the embossing roll method is preferred.

Exemplary embossing rolls used in the embossing roll method include an embossing roll having an emboss pattern (pattern of protrusions and recesses) on the roll surface which is prepared by blasting a metal roll surface with an abrasive material such as aluminum oxide or silicon oxide and lapping the surface through vertical grinding for the purpose of reducing excessive peaks of the surface. Other examples include an embossing roll having an emboss pattern (pattern of protrusions and recesses) on the roll surface which is prepared by transferring the emboss pattern (pattern of protrusions and recesses) to a metal roll surface with an engraving mill (mother mill). Other examples further include an embossing roll having an emboss pattern (pattern of protrusions and recesses) formed by etching (chemical engraving) on the roll surface.

The colored layer contains a colorant. In the case of forming a laminated glass for a vehicle using the interlayer film for a laminated glass of the present invention, for example, the colored layer imparts high anti-glare properties by preventing sunlight from coming directly into sight of the driver.

The colored layer may be disposed entirely or partially on the interlayer film for a laminated glass of the present invention. For example, in the case of forming a laminated glass for a vehicle using the interlayer film for a laminated glass of the present invention, the colored layer may be disposed in a belt-like shape along the upper portion of the laminated glass for a vehicle.

FIG. 4 is a view schematically illustrating a laminated glass for a vehicle whose colored layer is disposed in a belt-like shape along the upper portion. The colored layer may have a rectangular, wedge, trapezoidal, or triangular cross-sectional shape. For example, in the case of forming a laminated glass for a vehicle using the interlayer film for a laminated glass of the present invention whose colored layer has a wedge, trapezoidal, or triangular cross-sectional shape, a color gradient can be provided from the upper portion to the lower portion of the laminated glass for a vehicle (FIG. 4).

In the interlayer film for a laminated glass of the present invention, the minimum distance between the outer layer side surface of the colored layer and the surface having a large number of recesses of the outer layer is 150 μm or longer. With this structure, poor appearance in a colored portion can be prevented while excellent deaeration properties in production of a laminated glass are achieved. The minimum distance between the outer layer side surface of the colored layer and the surface having a large number of recesses of the outer layer is preferably 200 µm or longer, more preferably 240 µm or longer, still more preferably 300 µm or longer.

In the case where the interlayer film for a laminated glass of the present invention is a laminate which includes three or more layers with the outer layer having a large number of recesses on one surface being disposed on each surface of the laminate, the minimum distance between the outer layer side surface of the colored layer and the surface having a large number of recesses of each and every outer layer needs to be 150 µm or longer.

FIG. 5 is a view schematically illustrating the method for measuring the distance between the outer layer side surface of the colored layer and the surface having a large number of recesses of the outer layer. FIG. 5 illustrates a cross section of a portion including the colored layer and the outer layer in the interlayer film for a laminated glass.

FIG. 5(a) illustrates an interlayer film 51 for a laminated glass in which on a colored layer 511 having a rectangular cross sectional shape, an outer layer 512 having a large number of recesses on one surface is stacked. In FIG. 5(a), the distance "a" from the bottom of a recess on the outer layer 512 to the outer layer side surface of the colored layer 511 is the minimum distance between the outer layer side surface of the colored layer and the surface having a large number of recesses of the outer layer.

FIG. 5(b) illustrates an interlayer film 52 for a laminated glass in which on a colored layer 521 having a wedge cross sectional shape, an outer layer 522 having a large number of recesses on one surface is stacked. In FIG. 5(b), the distance "b" from the bottom of a recess on the outer layer 522 to the outer layer side surface of the colored layer 521 is the minimum distance between the outer layer side surface of the colored layer and the surface having a large number of recesses of the outer layer.

The interlayer film for a laminated glass of the present invention has a laminated structure which includes two or more layers including an outer layer disposed on the outermost surface of the interlayer film for a laminated glass and a colored layer containing a colorant and a thermoplastic resin. The interlayer film may have a laminated structure including three or more layers or a laminated structure including four or more layers. Including layers having different properties stacked on each other, the interlayer film can exhibit various properties that cannot be achieved by a monolayer structure.

Each layer of the interlayer film for a laminated glass of the present invention preferably contains a thermoplastic resin. Examples of the thermoplastic resin include polyvinylidene fluoride, polytetrafluoroethylene, vinylidene fluoride-propylene hexafluoride copolymers, polyethylene trifluoride, acrylonitrile-butadiene-styrene copolymers, polyester, polyether, polyamide, polycarbonate, polyacrylate, polymethacrylate, polyvinyl chloride, polyethylene, polypropylene, polystyrene, polyvinyl acetal, and ethylene-vinyl acetate copolymers. In particular, the resin layer preferably contains polyvinyl acetal or an ethylene-vinyl acetate copolymer, more preferably contains polyvinyl acetal.

Each layer of the interlayer film for a laminated glass of the present invention preferably contains polyvinyl acetal and a plasticizer.

FIG. 6 is a view schematically illustrating an exemplary preferred embodiment of the interlayer film for a laminated glass of the present invention. FIG. 6 illustrates a cross section of the interlayer film for a laminated glass. The interlayer film for a laminated glass of the present invention is described in more detail based on FIG. 6 in the following.

An interlayer film 6 for a laminated glass illustrated in FIG. 6 has a quadruple layer structure including an outer layer (first protective layer) 61 having a large number of recesses on one surface, a sound insulation layer 62, a colored layer 63, and a second protective layer 64 stacked in the stated order.

In the interlayer film 6 for a laminated glass, the sound insulation layer 62 imparts sound insulation properties. The sound insulation layer 62 preferably contains the polyvinyl acetal X and a plasticizer.

The polyvinyl acetal X can be prepared by acetalization of polyvinyl alcohol with an aldehyde. Commonly, the polyvinyl alcohol can be obtained by saponifying polyvinyl acetate.

The lower limit of the average degree of polymerization of the polyvinyl alcohol is preferably 200, and the upper limit thereof is preferably 5,000. When the polyvinyl alcohol has an average degree of polymerization of 200 or more, a sound insulation interlayer film to be obtained can have better penetration resistance. When the polyvinyl alcohol has an average degree of polymerization of 5,000 or less, formability of a sound insulation layer can be ensured. Concerning the average degree of polymerization of the polyvinyl alcohol, the lower limit is more preferably 500 and the upper limit is more preferably 4,000.

The average degree of polymerization of the polyvinyl alcohol can be obtained by the method in conformity with JIS K6726 "Testing methods for polyvinyl alcohol".

The lower limit of the carbon number of the aldehyde used for acetalization of the polyvinyl alcohol is preferably 4, and the upper limit thereof is preferably 6. When the aldehyde has a carbon number of 4 or more, an interlayer film for a laminated glass to be obtained can stably contain a sufficient amount of a plasticizer. As a result, the interlayer film can exhibit excellent sound insulation properties. Moreover, bleeding out of the plasticizer can be prevented. When the aldehyde has a carbon number of 6 or less, synthesis of the polyvinyl acetal X can be facilitated, ensuring the productivity. The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or lower, the sound insulation layer can contain a plasticizer in an amount needed for exhibiting sound insulation properties, and bleeding out of the plasticizer can be prevented. The upper limit of the hydroxy group content of the polyvinyl acetal X is more preferably 28 mol %, still more preferably 26 mol %, particularly preferably 24 mol %, and the lower limit thereof is preferably 10 mol %, more preferably 15 mol %, still more preferably 20 mol %. The hydroxy group content of the polyvinyl acetal X is a value in percentage of the mole fraction (mol %) obtained by dividing the amount of ethylene groups to which hydroxy groups are bonded by the total amount of ethylene groups of the main chain. The amount of ethylene groups to which hydroxy groups are bonded can be determined by measuring the amount of ethylene groups to which hydroxy groups are bonded in the polyvinyl acetal X by the method in conformity with JIS K6728 "Testing methods for polyvinyl butyral".

The lower limit of the acetal group content of the polyvinyl acetal X is preferably 60 mol %, and the upper limit thereof is preferably 85 mol %. When the polyvinyl acetal X has an acetal group content of 60 mol % or higher, the sound insulation layer has higher hydrophobicity and can contain a plasticizer in an amount needed for exhibiting sound insulation properties. Moreover, bleeding out of the plasticizer and whitening can be prevented. When the polyvinyl acetal X has an acetal group content of 85 mol % or lower, synthesis of the polyvinyl acetal X can be facilitated, ensuring the productivity. The lower limit of the acetal group content of the polyvinyl acetal X is more preferably 65 mol %, still more preferably 68 mol % or higher.

The acetal group content can be obtained by measuring the amount of ethylene groups to which acetal groups are bonded in the polyvinyl acetal X by the method in conformity with JIS K6728 "Testing methods for polyvinyl butyral".

The lower limit of the acetyl group content of the polyvinyl acetal X is preferably 0.1 mol %, and the upper limit thereof is preferably 30 mol %. When the acetyl group content of the polyvinyl acetal X is 0.1 mol % or higher, the sound insulation layer can contain a plasticizer in an amount needed for exhibiting sound insulation properties, and bleeding out of the plasticizer can be prevented. When the acetyl group content of the polyvinyl acetal X is 30 mol % or lower, the sound insulation layer can have higher hydrophobicity, preventing whitening. The lower limit of the acetyl group content is more preferably 1 mol %, still more preferably 5 mol %, particularly preferably 8 mol %, and the upper limit thereof is more preferably 25 mol %, still more preferably 20 mol %. The acetyl group content is a value in percentage of the mole fraction (mol %) obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain.

The polyvinyl acetal X is preferably a polyvinyl acetal having an acetyl group content of 8 mol % or higher or a polyvinyl acetal having an acetyl group content of lower than 8 mol % and an acetal group content of 65 mol % or higher because the sound insulation layer 62 can readily contain a plasticizer in an amount needed for exhibiting sound insulation properties. Moreover, the polyvinyl acetal X is more preferably a polyvinyl acetal having an acetyl group content of 8 mol % or higher or a polyvinyl acetal having an acetyl group content of lower than 8 mol % and an acetal group content of 68 mol % or higher.

Any plasticizer may be used as long as it is commonly used in interlayer films for a laminated glass. Examples thereof include organic plasticizers such as monobasic organic acid esters and polybasic organic acid esters, and phosphoric acid plasticizers such as organophosphate compounds and organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethylbutyrate, tetraethylene glycol-di-n-heptanoate, diethylene glycol-di-2-ethylhexanoate, diethylene glycol-di-2-ethylbutyrate, and diethylene glycol-di-n-heptanoate. Among these, the resin layer contains preferably triethylene glycol-di-2-ethylhexanoate, triethylene glycol-di-2-ethylbutyrate, or triethylene glycol-di-n-heptanoate, more preferably triethylene glycol-di-2-ethylhexanoate.

The lower limit of the plasticizer content of the sound insulation layer 62 based on 100 parts by mass of the polyvinyl acetal X is preferably 45 parts by mass, and the upper limit thereof is preferably 80 parts by mass. When the plasticizer content is 45 parts by mass or higher, the sound insulation layer 62 can exhibit high sound insulation properties. When the plasticizer content is 80 parts by mass or lower, reduction in the transparency and adhesiveness of an interlayer film for a laminated glass to be obtained due to bleeding out of the plasticizer can be prevented. The lower limit of the plasticizer content is more preferably 50 parts by mass, still more preferably 55 parts by mass, and the upper limit thereof is more preferably 75 parts by mass, still more preferably 70 parts by mass.

In the case where the sound insulation layer 62 has a rectangular cross-sectional shape in the thickness direction, the lower limit of the thickness of the sound insulation layer 62 is preferably 50 µm. Having a thickness of 50 µm or more, the sound insulation layer 62 can exhibit enough sound insulation properties. The lower limit of the thickness of the sound insulation layer 62 is more preferably 80 µm. The upper limit thereof is not particularly limited. In consideration of the thickness as an interlayer film for a laminated glass, the upper limit is preferably 300 µm.

The sound insulation layer 62 may have one end and the other end on an opposite side of the one end, and may have a shape in which the thickness of the other end is greater than the thickness of the one end. In this case, the lower limit of the minimum thickness of the sound insulation layer 62 is preferably 50 µm. Having the minimum thickness of 50 µm or more, the sound insulation layer 62 can exhibit enough sound insulation properties. The lower limit of the minimum thickness of the sound insulation layer 62 is more preferably 80 µm, still more preferably 100 µm. The upper limit of the maximum thickness of the sound insulation layer 62 is not particularly limited. The upper limit is preferably 300 µm in consideration of the thickness as an interlayer film for a laminated glass. The upper limit of the maximum thickness of the sound insulation layer 62 is more preferably 220 µm.

The outer layer (first protective layer) 61 in the interlayer film 6 for a laminated glass exhibits excellent deaeration properties in a production process of a laminated glass, prevents bleeding out of the plasticizer contained in a large amount in the sound insulation layer 62 to prevent reduction in the adhesiveness between the interlayer film for a laminated glass and the glass plate, and imparts penetration resistance to the interlayer film for a laminated glass.

The second protective layer 64 in the interlayer film 6 for a laminated glass prevents bleeding out of the plasticizer contained in a large amount in the sound insulation layer 62 to prevent reduction in the adhesiveness between the interlayer film for a laminated glass and the glass plate, and imparts penetration resistance to the interlayer film for a laminated glass. The second protective layer 64 may also be an outer layer having a large number of recesses on one surface. With this structure, the interlayer film for a laminated glass has a large number of recesses on each surface, and can exhibit even better deaeration properties in a production process of a laminated glass.

The outer layer (first protective layer) 61 having a large number of recesses on one surface and the second protective layer 64 each preferably contain, for example, a plasticizer and polyvinyl acetal Y, more preferably a plasticizer and the polyvinyl acetal Y having a higher hydroxy group content than the polyvinyl acetal X.

The polyvinyl acetal Y can be prepared by acetalization of polyvinyl alcohol with an aldehyde. The polyvinyl alcohol is commonly obtained by saponifying polyvinyl acetate.

The lower limit of the average degree of polymerization of the polyvinyl alcohol is preferably 200, and the upper limit thereof is preferably 5,000. When the polyvinyl alcohol has an average degree of polymerization of 200 or more, an interlayer film for a laminated glass to be obtained can have better penetration resistance. When the polyvinyl alcohol has an average degree of polymerization of 5,000 or less, formability of a protective layer can be ensured. Concerning the average degree of polymerization of the polyvinyl alcohol, the lower limit is more preferably 500 and the upper limit is more preferably 4,000.

The lower limit of the carbon number of the aldehyde used for acetalization of the polyvinyl alcohol is preferably 3, and the upper limit thereof is preferably 4. When the aldehyde has a carbon number of 3 or more, an interlayer film for a laminated glass to be obtained has higher penetration resistance. When the aldehyde has a carbon number of 4 or less, productivity of the polyvinyl acetal Y is improved.

The C3-C4 aldehyde may be a linear or branched aldehyde, and examples thereof include n-butyraldehyde.

The upper limit of the hydroxy group content of the polyvinyl acetal Y is preferably 33 mol %, and the lower limit thereof is preferably 28 mol %. When the polyvinyl acetal Y has a hydroxy group content of 33 mol % or lower, whitening of an interlayer film for a laminated glass to be obtained can be prevented. When the polyvinyl acetal Y has a hydroxy group content of 28 mol % or higher, an interlayer film for a laminated glass to be obtained has higher penetration resistance.

The lower limit of the acetal group content of the polyvinyl acetal Y is preferably 60 mol %, and the upper limit thereof is preferably 80 mol %. When the acetal group content is 60 mol % or higher, a protective layer to be obtained can contain a plasticizer in an amount needed for exhibiting enough penetration resistance. When the acetal group content is 80 mol % or lower, the adhesion force between the glass plate and each of the outer layer (first protective layer) 61 having a large number of recesses on one surface and the second protective layer 64 can be ensured. The lower limit of the acetal group content is more preferably 65 mol %, and the upper limit thereof is more preferably 69 mol %.

The upper limit of the acetyl group content of the polyvinyl acetal Y is preferably 7 mol %. When the polyvinyl acetal Y has an acetyl group content of 7 mol % or lower, a protective layer to be obtained can have higher hydrophobicity, thereby preventing whitening. The upper limit of the acetyl group content is more preferably 2 mol %, and the lower limit thereof is preferably 0.1 mol %. The hydroxy group content, acetal group content, and acetyl group content of the polyvinyl acetal Y can be measured by the same methods as those in the case of the polyvinyl acetal X.

The lower limit of the plasticizer content of the outer layer (first protective layer) 61 having a large number of recesses on one surface and the second protective layer 64 based on 100 parts by mass of the polyvinyl acetal Y is preferably 20 parts by mass, and the upper limit thereof is preferably 45 parts by mass. When the plasticizer content is 20 parts by mass or higher, the penetration resistance can be ensured. When the plasticizer content is 45 parts by mass or lower, bleeding out of the plasticizer can be prevented, thereby preventing reduction in the transparency and adhesiveness of an interlayer film for a laminated glass to be obtained. The lower limit of the plasticizer content is more preferably 30 parts by mass, still more preferably 35 parts by mass, and the upper limit thereof is more preferably 43 parts by mass, still more preferably 41 parts by mass. For better sound insulation properties of a laminated glass to be obtained, the plasticizer contents of the outer layer (first protective layer) 61 having a large number of recesses on one surface and the second protective layer 64 are preferably lower than the plasticizer content of the sound insulation layer 62.

For higher sound insulation properties of a laminated glass to be obtained, the hydroxy group content of the polyvinyl acetal Y is preferably higher than the hydroxy group content of the polyvinyl acetal X, more preferably higher by 1 mol % or more, still more preferably higher by 5 mol % or more, particularly preferably higher by 8 mol % or more. Adjustment of the hydroxy group contents of the polyvinyl acetal X and polyvinyl acetal Y enables control of the plasticizer contents of the sound insulation layer 62, the outer layer (first protective layer) 61 having a large number of recesses on one surface and the second protective layer 64, so that the sound insulation layer 62 has a lower glass transition temperature. As a result, a laminated glass to be obtained has higher sound insulation properties.

For still higher sound insulation properties of a laminated glass to be obtained, the plasticizer content of the sound insulation layer 62 (hereafter, also referred to as content X) based on 100 parts by mass of the polyvinyl acetal X is preferably higher than the plasticizer content of each of the outer layer (first protective layer) 61 having a large number of recesses on one surface and the second protective layer 64 (hereafter, also referred to as content Y) based on 100 parts by mass of the polyvinyl acetal Y, more preferably higher by 5 parts by mass or more, still more preferably higher by 15 parts by mass or more, particularly preferably higher by 20 parts by mass or more. Adjustment of the content X and content Y lowers the glass transition temperature of the sound insulation layer 62. As a result, a laminated glass to be obtained has still higher sound insulation properties.

The outer layer (first protective layer) 61 having a large number of recesses on one surface and the second protective layer 64 may each have any thickness, provided that it can fulfill the role as the protective layer. The lower limit of the thickness of the protective layer having a rectangular cross-sectional shape is preferably 100 µm, more preferably 300 µm, still more preferably 400 µm, particularly preferably 450 µm. The upper limit of the thickness of each of the outer layer (first protective layer) 61 having a large number of recesses on one surface and the second protective layer 64 is not particularly limited. In order to ensure the thickness of the sound insulation layer 62 enough to achieve sufficient sound insulation properties, the upper limit of the thickness of each of the outer layer (first protective layer) 61 having a large number of recesses on one surface and the second protective layer 64 is practically about 500 µm.

The protective layer may have one end and the other end on an opposite side of the one end, and may have a shape in which the thickness of the other end is greater than the thickness of the one end. The protective layer may have any thickness, provided that it can fulfill the role as the protective layer. In the case where protrusions and recesses are formed on the protective layer, the protective layer is preferably as thick as possible to prevent the protrusions and recesses from being transferred to the interface with the sound insulation layer directly in contact with the protective layer. Specifically, the lower limit of the minimum thickness of the protective layer is preferably 100 µm, more preferably 300 µm, still more preferably 400 µm, particularly preferably 450 µm. The upper limit of the maximum thickness of the protective layer is not particularly limited. In order to ensure the thickness of the sound insulation layer enough to achieve sufficient sound insulation properties, the upper limit of the protective layer is practically about 1,000 µm, preferably 800 µm.

The interlayer film for a laminated glass of the present invention may have one end and the other end on an opposite side of the one end. The one end and the other end are end portions on both sides facing each other in the interlayer film. In the interlayer film for a laminated glass of the present invention, the thickness of the other end is preferably greater than the thickness of the one end. A laminated glass prepared using the interlayer film for a laminated glass of the present invention having such a shape where the thickness is different between one end and the other end can be suitably used in a head-up display. In this case, occurrence of double images can be effectively suppressed. The interlayer film for a laminated glass of the present invention may have a wedge cross-sectional shape. Provided that the interlayer film for a laminated glass has a wedge cross-sectional shape, a head-up display can perform image display without occurrence of double images by adjusting wedge angle θ of the wedge shape according to the mounting angle of the laminated glass. The lower limit of the wedge angle θ is preferably 0.1 mrad, more preferably 0.2 mrad, still more preferably 0.3 mrad, and the upper limit thereof is preferably 1 mrad, more preferably 0.9 mrad, from the viewpoint of further suppressing the occurrence of double images. In the case of producing the interlayer film for a laminated glass having a wedge cross-sectional shape, for example, by extrusion molding of a resin composition using an extruder, the produced interlayer film may have a shape having the minimum thickness in a region slightly inward from the end on the thinner side (specifically, when the distance from one end to the other end is defined as X, a region within a distance of 0X to 0.2X inward from the end on the thinner side) and having the maximum thickness in a region slightly inward from the end on the thicker side (specifically, when the distance from one end to the other end is defined as X, a region within a distance of 0X to 0.2X inward from the end on the thicker side). Such a shape is herein also included in the wedge shape.

The colored layer 63 imparts high anti-glare properties to the interlayer film for a laminated glass.

The colored layer 63 preferably contains, for example, a colorant, a polyvinyl acetal, and a plasticizer.

The polyvinyl acetal and the plasticizer used for the colored layer 63 are not particularly limited, and may be the same as those used for the outer layer (first protective layer) 61 having a large number of recesses on one surface, the sound insulation layer 62, and the second protective layer 64.

The colorant is one obtained by dispersing a derivative of a substance such as phthalocyanine, anthraquinone, perylene, or titanium oxide or a dye or pigment such as an azo compound or carbon black in a plasticizer using a surfactant. Specific examples thereof include commercially available products including products available under the trade name of "SG-8E905", "SG-4E408", "SG-100N", "SG-5A1251", or "SG-4A1053" from Sumika Color Co., Ltd. The colorant is not particularly limited to these commercially available products, and may be a mixture of two or more thereof.

The concentration of the colorant in the colored layer 63 is not particularly limited, and may appropriately be selected based on the conditions such as the desired anti-glare properties, the colorant used, and the thickness of the colored layer.

The thickness of the colored layer 63 is not particularly limited, and may appropriately be selected based on the conditions such as the desired anti-glare properties, the colorant used, and the concentration of the colorant. The colored layer 63 may have one end and the other end on an opposite side of the one end, and may have a wedge cross-sectional shape in the thickness direction.

Each layer of the interlayer film 6 for a laminated glass preferably contains an adhesion modifier. In particular, the outer layer (first protective layer) 61 having a large number of recesses on one surface and the second protective layer 64 to be in contact with a glass plate in production of a laminated glass each preferably contain an adhesion modifier.

As the adhesion modifier, for example, an alkali metal salt or an alkaline earth metal salt is preferably used. Examples of the adhesion modifier include salts such as potassium, sodium, and magnesium salts.

Examples of an acid forming the salts include organic carboxylic acids such as octylic acid, hexylic acid, 2-ethylbutyric acid, butyric acid, acetic acid, and formic acid, and inorganic acids such as hydrochloric acid and nitric acid. The outer layer (first protective layer) 61 having a large number of recesses on one surface and the second protective layer 64 to be in contact with a glass plate each preferably contain magnesium salt as an adhesion modifier because the adhesion force between the glass plate and the resin layer can be easily adjusted in production of a laminated glass.

Each layer of the interlayer film 6 for a laminated glass may optionally contain additives such as an antioxidant, a light stabilizer, a modified silicone oil as an adhesion modifier, a flame retardant, an antistatic agent, a damp proofing agent, a heat ray reflecting agent, and a heat ray absorbing agent.

The interlayer film 6 for a laminated glass may be produced by any method. In an exemplary method, the outer layer (first protective layer) 61 having a large number of recesses on one surface, the sound insulation layer 62, the colored layer 63, and the second protective layer 64 are each formed in a sheet shape by a common sheet-forming method such as an extrusion method, a calender method, or a press method, and the resulting layers are stacked on each other.

The interlayer film for a laminated glass of the present invention is preferably used for vehicles, particularly preferably for a vehicular windshield.

The present invention also encompasses a laminated glass including the interlayer film for a laminated glass of the present invention interposed between a pair of glass plates.

The glass plate may be a commonly used transparent glass plate. Examples thereof include inorganic glass plates such as float glass plates, polished glass plates, figured glass plates, meshed glass plates, wired glass plates, colored glass plates, heat-absorbing glass plates, heat-reflecting glass plates, and green glass plates. An ultraviolet shielding glass plate including an ultraviolet shielding coat layer on a glass surface may also be used. Moreover, also usable are organic plastic plates made of polyethylene terephthalate, polycarbonate, polyacrylate, or the like.

The glass plates may include two or more types of glass plates. For example, the laminated glass may be a laminated glass including the interlayer film for a laminated glass of the present invention between a transparent float glass plate and a colored glass plate such as a green glass plate. The glass plates may include two or more glass plates with different thicknesses.

Advantageous Effects of Invention

The present invention can provide an interlayer film for a laminated glass which includes two or more stacked resin layers including a colored layer, exhibits excellent deaeration properties in a production process of a laminated glass, and is capable of preventing poor appearance of a colored portion, and a laminated glass including the interlayer film for a laminated glass.

DESCRIPTION OF EMBODIMENTS

Figure 1:
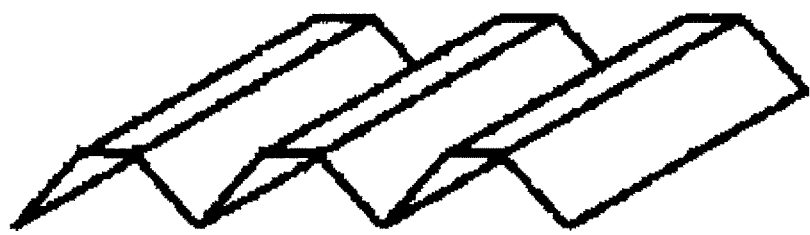
FIG. 1 is a view schematically illustrating an exemplary interlayer film for a laminated glass having, on the surface thereof, recesses having a groove shape with a continuous bottom arranged adjacently parallel to each other at equal intervals.
Figure 2:
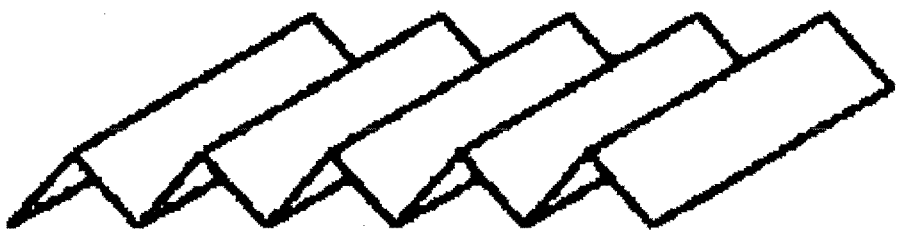
FIG. 2 is a view schematically illustrating an exemplary interlayer film for a laminated glass having, on the surface thereof, recesses having a groove shape with a continuous bottom arranged adjacently parallel to each other at equal intervals.
Figure 3:
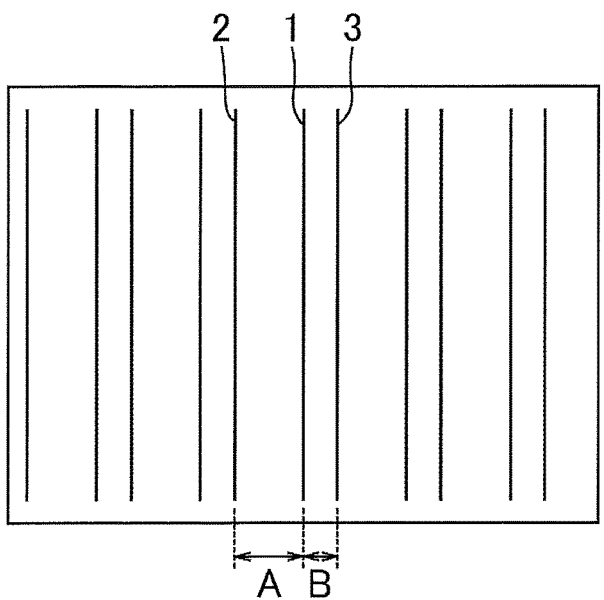
FIG. 3 is a view schematically illustrating an exemplary pattern of recesses in the shape of engraved lines formed on the surface of an interlayer film for a laminated glass.
Figure 4:
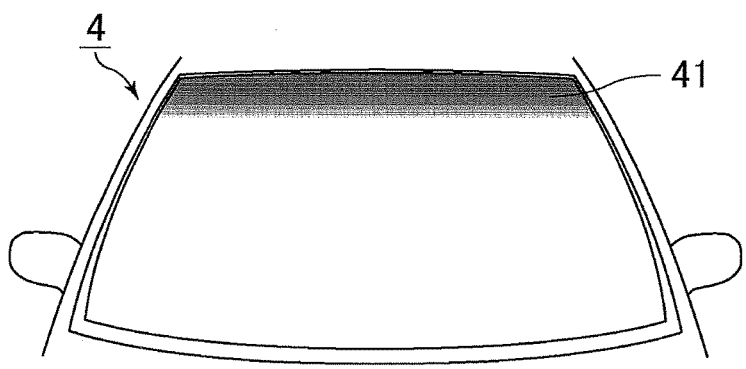
FIG. 4 is a view schematically illustrating a laminated glass for a vehicle whose colored layer is disposed in a belt-like shape along the upper portion.
Figure 5:
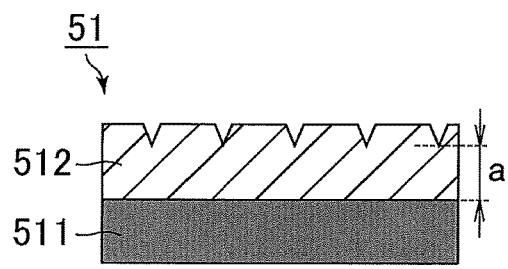
FIG. 5 is a view schematically illustrating the method for measuring the distance between an outer layer side surface of a colored layer and the surface having a large number of recesses of the outer layer.
Figure 5:
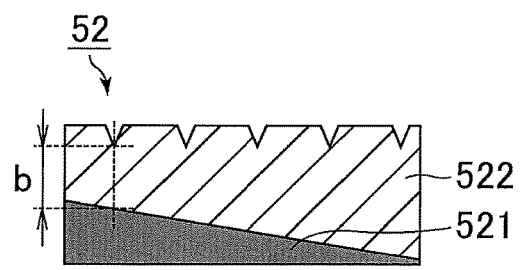
Figure 6:
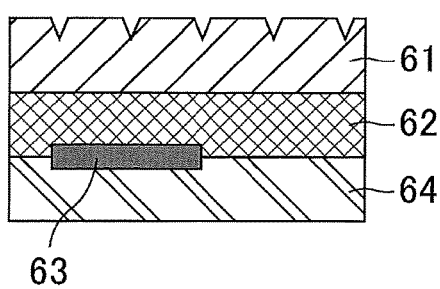
FIG. 6 is a view schematically illustrating an exemplary preferred embodiment of the interlayer film for a laminated glass of the present invention.

Embodiments of the present invention are more specifically described in the following with reference to, but not limited to, examples.
(Preparation of a Resin Composition for an Outer Layer and a Protective Layer)

Polyvinyl alcohol having an average degree of polymerization of 1,700 was acetalized with n-butyraldehyde to give polyvinyl butyral (PVB1, acetyl group content: 1 mol %, butyral group content: 69 mol %, hydroxy group content: 30 mol %). To 100 parts by mass of the polyvinyl butyral was added 40 parts by mass of triethylene glycol-di-2-ethylhexanoate (3GO) as a plasticizer, and the mixture was kneaded well with a mixing roll to give a resin composition for an outer layer and a protective layer.
(Preparation of a Resin Composition for a Colored Layer)

Polyvinyl alcohol having an average degree of polymerization of 1,700 was acetalized with n-butyraldehyde to give polyvinyl butyral (PVB1, acetyl group content: 1 mol %, butyral group content: 69 mol %, hydroxy group content: 30 mol %). To 100 parts by mass of the polyvinyl butyral were added three or four parts by mass of SG-8E905 (Sumika Color Co., Ltd.) as a colorant and 36 or 37 parts by mass of triethylene glycol-di-2-ethylhexanoate (3GO) as a plasticizer, and the mixture was kneaded well with a mixing roll to give a resin composition for a colored layer.
(Preparation of a Resin Composition for a Sound Insulation Layer)

Polyvinyl alcohol having an average degree of polymerization of 2,400 was acetalized with n-butyraldehyde to give polyvinyl butyral (PVB2, acetyl group content: 12 mol %, butyral group content: 65 mol %, hydroxy group content: 23 mol %). To 100 parts by mass of the polyvinyl butyral was added 60 parts by mass of triethylene glycol-di-2-ethylhexanoate (3GO) as a plasticizer, and the mixture was kneaded well with a mixing roll to give a resin composition for a sound insulation layer.

Examples 1 to 6, Comparative Examples 1 and 2

(1) Preparation of a Laminate

The obtained resin composition for an outer layer and a protective layer, resin composition for a colored layer, and resin composition for a sound insulation layer were co-extruded in accordance with Tables 1 and 2 using a co-extruder to form a laminate having a triple to quintuple layer structure including an outer layer (protective layer) 1, a sound insulation layer, a protective layer 3, a colored layer, and an outer layer (protective layer) 2 stacked in the stated order (the order shown in the tables).

In Examples 5 and 6, the colorants used were "SG-5A1251" and "SG-4A1053", respectively.
(2) Impartment of Recesses Recesses were imparted to the surface of the obtained laminate by the following method to give an interlayer film for a laminated glass.

In the first step, a random pattern of protrusions and recesses was transferred to both surfaces of the laminate by the following process. First, random protrusions and recesses were formed on iron roll surfaces with an abrasive material, and the iron rolls were subjected to vertical grinding. Finer protrusions and recesses were further formed on planar portions with a finer abrasive material after the grinding. In this manner, a pair of rolls in the same shape having a coarse main embossed pattern and a fine sub-embossed pattern were obtained. The pair of rolls was used as a device for transferring a pattern of protrusions and recesses to transfer a random pattern of protrusions and recesses to both surfaces of the obtained laminate. The transferring conditions employed here were a temperature of the laminate of 80° C., a temperature of the rolls of 145° C., a linear velocity of 10 m/min, and a linear pressure of 50 to 100 kN/m.

In the second step, recesses having a groove shape with a continuous bottom (shape of an engraved line) were imparted to a surface of the laminate by the following process, so that an interlayer film for a laminated glass was obtained. A pair of rolls including a metal roll having a surface milled with a triangular oblique line-type mill and a rubber roll having a JIS hardness of 45 to 75 was used as a device for transferring a pattern of protrusions and recesses. The obtained laminate to which the random pattern of protrusions and recesses was transferred in the first step was passed through the device for transferring a pattern of protrusions and recesses, whereby protrusions and recesses in which recesses having a groove shape with a continuous bottom (shape of an engraved line) were arranged parallel to each other at equal intervals were imparted to one surface of the laminate. The transferring was performed under the conditions of a temperature of the interlayer film for laminated glass of ambient temperature, a roll temperature of 130° C., a linear velocity of 10 m/min, a film width of 1.5 m, and a pressure of 500 kPa.

Subsequently, the similar treatment was performed to impart recesses having a groove shape with a continuous bottom (shape of an engraved line) to the other surface of the interlayer film for a laminated glass, except that the shape of the protrusions and recesses on a metal roll used was different.

(3) Measurement of Rz and Sm on Outer Layer of Interlayer Film for Laminated Glass The ten-point average roughness Rz and average interval Sm of the recesses on the surface of the obtained interlayer film for a laminated glass were measured in conformity with JIS B 0601 (1994) with a high-precision profilometry system (Keyence Corporation, "KS-1100" equipped with a tip head of "LT-9510VM" model). The measurement was performed under the conditions of a stage travel rate of 1000 μm/s, a measurement pitch of the X-axis of 10 μm, a measurement pitch of the Y-axis of 10 μm, a horizontal visual field of 2.5 cm and a vertical visual field of 1 cm. The line roughness (1994 JIS) of the obtained data was analyzed with analysis software KS-Analyzer (Keyence Corporation) using a horizontal line and height smoothing correction (cut-off value: 2.50 mm, simple average: ±12). Each of the Rz and Sm used was the average of arbitrarily selected three points that were spaced by at least 1 mm in the perpendicular direction of the image.

(4) Measurement of the Minimum Distance Between the Outer Layer Side Surface of the Colored Layer and the Surface Having a Large Number of Recesses of the Outer Layer in the Interlayer Film for a Laminated Glass The obtained interlayer film for a laminated glass was stored in an atmosphere with a room temperature of 23° C. and a humidity of 40% for at least 24 hours. Under the same conditions, the interlayer film for a laminated glass including a colored portion was cut with a pair of scissors (Hayashi Cutlery Co., Ltd., model 15101) into a cuboid having a size of 2 mm (MD direction)×20 mm (TD direction). The cutting position here was within 50 mm in the MD direction from an end of the sample used for production of the laminated glass and subjected to appearance checking. The cross section of the cut interlayer film for a laminated glass was observed with a digital microscope (Nakaden Corporation, model FS1400) with a magnification of ×270 to measure the minimum distance between the surface having a large number of recesses of the outer layer and the outer layer side surface of the colored layer. The stage on which the sample was placed was a transmitted lighting for low magnification systems available from Nakaden Corporation.

(5) Production of a Laminated Glass

The obtained interlayer film for a laminated glass was sandwiched between two clear glass plates (30 cm in length× 30 cm in width×2.5 mm in thickness) in conformity with JIS R 3202 (1996) and the portions of the film protruding from the glass plates were cut off, whereby a laminated glass structure was prepared. The resulting laminated glass structure was transferred into a rubber bag, which was then connected to a vacuum suction device. The rubber bag was heated so that the temperature of the laminated glass structure (preliminary pressure bonding temperature) reached 70° C., while being held under a reduced pressure of −60 kPa (absolute pressure of 16 kPa) for 10 minutes. Thereafter, the pressure was returned to atmospheric pressure so that the preliminary pressure bonding was completed.

The preliminary bonded laminated glass structure was placed in an autoclave at a temperature of 140° C. and a pressure of 1300 kPa for 20 minutes. The temperature was dropped to 50° C. to return the pressure to atmospheric pressure so that the final pressure bonding was completed. Thereby, a laminated glass was obtained.

Examples 7 to 11, Comparative Example 3

A laminate having a triple or quadruple layer structure was obtained by the same procedure as that in Example 1, except that the co-extrusion conditions of the obtained resin composition for an outer layer and a protective layer, resin composition for a colored layer, and resin composition for a sound insulation layer were changed and the laminate width was changed from 1.5 m to 1.0 m such that the cross-sectional shape, maximum thickness, minimum thickness, and length in the width direction of the outer layer (protective layer) 1, the sound insulation layer, the colored layer, the outer layer (protective layer) 2, and the whole interlayer film obtained after impartment of protrusions and recesses were as shown in Tables 3 and 4. The co-extrusion conditions were adjusted, so that a temperature gradient was provided to the die lip in the range from 100° C. to 280° C. such that the end of the whole interlayer film with a smaller thickness in the width direction would come to the low temperature side and the end of the whole interlayer film with a larger thickness would come to the high temperature side, and the lip interval was set in the range of 1.0 to 4.0 mm.

Also, Rz, Sm, and the minimum distance between the outer layer side surface of the colored layer and the surface having a large number of recesses of the outer layer were measured by the same methods as those in Example 1. Since the thickness of each of the protective layer 1, the sound insulation layer, the colored layer, and the outer layer varies in the width direction in each of Examples 7 to 11 and Comparative Example 3, the thickness of each layer was measured at a colored side end (end on the side with a colored portion) and at a transparent side end (end without a colored portion). In Example 10, the colorant used was "SG-5A1251".

An interlayer film for a laminated glass was obtained by imparting protrusions and recesses to the obtained laminate by the same method as that in Example 1, except that the conditions for the impartment of protrusions and recesses were changed such that the surface roughness Rz and the interval Sm of the obtained interlayer for a laminated glass were the values as shown in Tables 3 and 4.

The obtained interlayer film for a laminated glass was sandwiched between two clear glass plates (30 cm in length× 30 cm in width×2.5 mm in thickness) in conformity with JIS R 3202 (1996) such that the region where the colored layer had the maximum thickness came between the plates, and the portions of the film protruding from the glass plates were cut off, whereby a laminate was prepared. The resulting laminated glass structure was transferred into a rubber bag, which was then connected to a vacuum suction device. The rubber bag was heated so that the temperature of the laminated glass structure (preliminary pressure bonding temperature) reached 70° C., while being held under a reduced pressure of −60 kPa (absolute pressure of 16 kPa) for 10 minutes. Thereafter, the pressure was returned to atmospheric pressure so that the preliminary pressure bonding was completed.

The preliminary bonded laminated glass structure was placed in an autoclave at a temperature of 140° C. and a pressure of 1300 kPa for 20 minutes. The temperature was dropped to 50° C. to return the pressure to atmospheric pressure so that the final pressure bonding was completed. Thereby, a laminated glass was obtained.

(Evaluation)

The appearance of the colored layer portion in the laminated glass obtained in each of the examples and comparative examples was evaluated by the following method. Tables 1 to 4 show the results.

(Evaluation on Appearance by Visual Observation)

The obtained laminated glass was put on a light table (Ayase Kogyo K.K., model 122062), and whether or not the laminated glass had color unevenness was determined by visual observation. The laminated glass was evaluated as a poor appearance product and marked as "x (poor)" when at least four observers out of 10 observers perceived color unevenness. The laminated glass was evaluated as a good appearance product and marked as "0 (good)" when three or less observers perceived color unevenness.

(Measurement of Visible Light Transmittance)

The visible light transmittance of the laminated glass was evaluated based on an index Tv (total visible light transmittance). The index Tv was calculated by determining the weighted average of the transmittances at a wavelength of 380 to 780 nm in conformity with JIS R 3212 (1998) and JIS Z 8722.

TABLE 1

| | | | Example 1 | Example 2 | Example 3 | Example 4 |
|---|---|---|---|---|---|---|
| Outer layer (protective layer) 1 | Thermoplastic resin | Type | PVB1 | PVB1 | PVB1 | PVB1 |
| | | Amount (parts by mass) | 100 | 100 | 100 | 100 |
| | Plasticizer | Type | 3GO | 3GO | 3GO | 3GO |
| | | Amount (parts by mass) | 40 | 40 | 40 | 40 |
| | Roughness Rz of surface having recesses (µm) | | 43 | 35 | 61 | 26 |
| | Interval Sm of recesses (µm) | | 233 | 205 | 212 | 482 |
| | Thickness (µm) | | 267 | 214 | 296 | 341 |
| Sound insulation layer | Thermoplastic resin | Type | — | PVB2 | PVB2 | — |
| | | Amount (parts by mass) | — | 100 | 100 | — |
| | Plasticizer | Type | — | 3GO | 3GO | — |
| | | Amount (parts by mass) | — | 60 | 60 | — |
| | Thickness (µm) | | — | 91 | 98 | — |
| Protective layer 3 | Thermoplastic resin | Type | — | — | — | — |
| | | Amount (parts by mass) | — | — | — | — |
| | Plasticizer | Type | — | — | — | — |
| | | Amount (parts by mass) | — | — | — | — |
| | Thickness (µm) | | — | — | — | — |
| Colored layer | Thermoplastic resin | Type | PVB1 | PVB1 | PVB1 | PVB1 |
| | | Amount (parts by mass) | 100 | 100 | 100 | 100 |
| | Colorant | Type | SG-8E905 | SG-8E905 | SG-8E905 | SG-8E905 |
| | | Amount (parts by mass) | 3 | 4 | 4 | 3 |
| | Plasticizer | Type | 3GO | 3GO | 3GO | 3GO |
| | | Amount (parts by mass) | 37 | 36 | 36 | 37 |
| | Thickness (µm) | | 270 | 144 | 178 | 270 |
| Outer layer (protective layer) 2 | Thermoplastic resin | Type | PVB1 | PVB1 | PVB1 | PVB1 |
| | | Amount (parts by mass) | 100 | 100 | 100 | 100 |
| | Plasticizer | Type | 3GO | 3GO | 3GO | 3GO |
| | | Amount (parts by mass) | 40 | 40 | 40 | 40 |
| | Roughness Rz of surface having recesses (µm) | | 57 | 37 | 53 | 30 |
| | Interval Sm of recesses (µm) | | 221 | 203 | 240 | 750 |
| | Thickness (µm) | | 243 | 370 | 248 | 155 |
| Whole interlayer film | Arrangement | | Protective layer 1/colored layer/protective layer 2 | Protective layer 1/sound insulation layer/colored layer/protective layer 2 | Protective layer 1/sound insulation layer/colored layer/protective layer 2 | Protective layer 1/colored layer/protective layer 2 |
| Minimum distance between surface of colored layer and surface of outer layer (protective layer) 1 having recesses (µm) | | | 267 | 305 | 394 | 341 |
| Minimum distance between surface of colored layer and surface of outer layer (protective layer) 2 having recesses (µm) | | | 243 | 370 | 248 | 155 |
| Evaluation | Evaluation on appearance by visual observation | | ○ | ○ | ○ | ○ |
| | Visible light transmittance (%) | | 8.8 | 17.1 | 11.8 | 7.0 |

TABLE 2

| | | | Example 5 | Example 6 | Comparative Example 1 | Comparative Example 2 |
|---|---|---|---|---|---|---|
| Outer layer (protective layer) 1 | Thermoplastic resin | Type | PVB1 | PVB1 | PVB1 | PVB1 |
| | | Amount (parts by mass) | 100 | 100 | 100 | 100 |
| | Plasticizer | Type | 3GO | 3GO | 3GO | 3GO |
| | | Amount (parts by mass) | 40 | 40 | 40 | 40 |
| | Roughness Rz of surface having recesses (µm) | | 28 | 29 | 45 | 49 |
| | Interval Sm of recesses (µm) | | 477 | 485 | 215 | 220 |
| | Thickness (µm) | | 308 | 252 | 338 | 268 |
| Sound insulation layer | Thermoplastic resin | Type | — | — | PVB2 | PVB2 |
| | | Amount (parts by mass) | — | — | 100 | 100 |
| | Plasticizer | Type | — | — | 3GO | 3GO |
| | | Amount (parts by mass) | — | — | 60 | 60 |
| | Thickness (µm) | | — | — | 105 | 113 |

TABLE 2-continued

|  |  |  | Example 5 | Example 6 | Comparative Example 1 | Comparative Example 2 |
|---|---|---|---|---|---|---|
| Protective layer 3 | Thermoplastic resin | Type | — | — | — | PVB1 |
|  |  | Amount (parts by mass) | — | — | — | 100 |
|  | Plasticizer | Type | — | — | — | 3GO |
|  |  | Amount (parts by mass) | — | — | — | 40 |
|  | Thickness (μm) |  | — | — | — | 111 |
| Colored layer | Thermoplastic resin | Type | PVB1 | PVB1 | PVB1 | PVB1 |
|  |  | Amount (parts by mass) | 100 | 100 | 100 | 100 |
|  | Colorant | Type | SG-5A1251 | SG-4A1053 | SG-8E905 | SG-8E905 |
|  |  | Amount (parts by mass) | 3 | 3 | 4 | 4 |
|  | Plasticizer | Type | 3GO | 3GO | 3GO | 3GO |
|  |  | Amount (parts by mass) | 37 | 37 | 36 | 36 |
|  | Thickness (μm) |  | 278 | 256 | 229 | 244 |
| Outer layer (protective layer) 2 | Thermoplastic resin | Type | PVB1 | PVB1 | PVB1 | PVB1 |
|  |  | Amount (parts by mass) | 100 | 100 | 100 | 100 |
|  | Plasticizer | Type | 3GO | 3GO | 3GO | 3GO |
|  |  | Amount (parts by mass) | 40 | 40 | 40 | 40 |
|  | Roughness Rz of surface having recesses (μm) |  | 30 | 28 | 46 | 56 |
|  | Interval Sm of recesses (μm) |  | 742 | 740 | 209 | 217 |
|  | Thickness (μm) |  | 178 | 264 | 147 | 84 |
| Whole interlayer film | Arrangement |  | Protective layer 1/colored layer/protective layer 2 | Protective layer 1/colored layer/protective layer 2 | Protective layer 1/sound insulation layer/colored layer/protective layer 2 | Protective layer 1/sound insulation layer/protective layer 3/colored layer/protective layer 2 |
| Minimum distance between surface of colored layer and surface of outer layer (protective layer) 1 having recesses (μm) |  |  | 308 | 252 | 443 | 492 |
| Minimum distance between surface of colored layer and surface of outer layer (protective layer) 2 having recesses (μm) |  |  | 178 | 264 | 147 | 84 |
| Evaluation | Evaluation on appearance by visual observation |  | ○ | ○ | x | x |
|  | Visible light transmittance (%) |  | 8.0 | 10.5 | 5.5 | 3.9 |

TABLE 3

|  |  |  | Example 7 | Example 8 | Example 9 |
|---|---|---|---|---|---|
| Outer layer (protective layer) 1 | Thermoplastic resin | Type | PVB1 | PVB1 | PVB1 |
|  |  | Amount (parts by mass) | 100 | 100 | 100 |
|  | Plasticizer | Type | 3GO | 3GO | 3GO |
|  |  | Amount (parts by mass) | 40 | 40 | 40 |
|  | Roughness Rz of surface having recesses (μm) |  | 35 | 40 | 29 |
|  | Interval Sm of recesses (μm) |  | 200 | 300 | 485 |
|  | Cross-sectional shape |  | Partial wedge shape | Partial wedge shape | Partial wedge shape |
|  | Maximum thickness (μm) |  | 560 | 490 | 490 |
|  | Minimum thickness (μm) |  | 400 | 325 | 350 |
| Sound insulation layer | Thermoplastic resin | Type | — | PVB2 | PVB2 |
|  |  | Amount (parts by mass) | — | 100 | 100 |
|  | Plasticizer | Type | — | 3GO | 3GO |
|  |  | Amount (parts by mass) | — | 60 | 60 |
|  | Cross-sectional shape |  | — | Wedge shape | Wedge shape |
|  | Maximum thickness (μm) |  | — | 150 | 150 |
|  | Minimum thickness (μm) |  | — | 100 | 100 |
| Colored layer | Thermoplastic resin | Type | PVB1 | PVB1 | PVB1 |
|  |  | Amount (parts by mass) | 100 | 100 | 100 |
|  | Colorant | Type | SG-8E905 | SG-8E905 | SG-8E905 |
|  |  | Amount (parts by mass) | 2 | 2 | 2 |
|  | Plasticizer | Type | 3GO | 3GO | 3GO |
|  |  | Amount (parts by mass) | 37 | 36 | 36 |
|  | Cross-sectional shape |  | Wedge shape | Wedge shape | Wedge shape |
|  | Length of colored layer in width direction (cm) |  | 20 | 20 | 20 |

TABLE 3-continued

|  |  |  | Example 7 | Example 8 | Example 9 |
|---|---|---|---|---|---|
| Outer layer (protective layer) 2 | | Maximum thickness (μm) | 400 | 400 | 400 |
| | | Minimum thickness (μm) | 0 | 0 | 0 |
| | Thermoplastic resin | Type | PVB1 | PVB1 | PVB1 |
| | | Amount (parts by mass) | 100 | 100 | 100 |
| | Plasticizer | Type | 3GO | 3GO | 3GO |
| | | Amount (parts by mass) | 40 | 40 | 40 |
| | Roughness Rz of surface having recesses (μm) | | 36 | 42 | 31 |
| | Interval Sm of recesses (μm) | | 202 | 390 | 749 |
| | Cross-sectional shape | | Partial wedge shape | Partial wedge shape | Partial wedge shape |
| | Maximum thickness (μm) | | 560 | 490 | 490 |
| | Minimum thickness (μm) | | 400 | 325 | 200 |
| Film end portion (transparent side) | Thickness of protective layer 1 [μm] | | 400 | 350 | 350 |
| | Thickness of sound insulation layer [μm] | | — | 100 | 100 |
| | Thickness of colored layer [μm] | | 0 | 0 | 0 |
| Film end portion (colored side) | Thickness of protective layer 2 [μm] | | 400 | 350 | 350 |
| | Thickness of protective layer 1 [μm] | | 400 | 325 | 450 |
| | Thickness of sound insulation layer [μm] | | — | 150 | 150 |
| | Thickness of colored layer [μm] | | 400 | 400 | 400 |
| | Thickness of protective layer 2 [μm] | | 400 | 325 | 200 |
| Whole interlayer film | Arrangement | | Protective layer 1/colored layer/protective layer 2 | Protective layer 1/sound insulation layer/colored layer/protective layer 2 | Protective layer 1/sound insulation layer/colored layer/protective layer 2 |
| | Cross-sectional shape | | Wedge shape | Wedge shape | Wedge shape |
| | Wedge angle θ [mrad] | | 0.4 | 0.4 | 0.4 |
| | Maximum thickness (μm) | | 1200 | 1200 | 1200 |
| | Minimum thickness (μm) | | 800 | 800 | 800 |
| Minimum distance between surface of colored layer and surface of outer layer (protective layer) 1 having recesses (μm) | | | 400 | 475 | 600 |
| Minimum distance between surface of colored layer and surface of outer layer (protective layer) 2 having recesses (μm) | | | 400 | 325 | 200 |
| Evaluation | Evaluation on appearance by visual observation | | ○ | ○ | ○ |
| | Visible light transmittance (%) | | 8.5 | 9.2 | 9.0 |

TABLE 4

|  |  |  | Example 10 | Example 11 | Comparative Example 3 |
|---|---|---|---|---|---|
| Outer layer (protective layer) 1 | Thermoplastic resin | Type | PVB1 | PVB1 | PVB1 |
| | | Amount (parts by mass) | 100 | 100 | 100 |
| | Plasticizer | Type | 3GO | 3GO | 3GO |
| | | Amount (parts by mass) | 40 | 40 | 40 |
| | Roughness Rz of surface having recesses (μm) | | 30 | 38 | 45 |
| | Interval Sm of recesses (μm) | | 210 | 200 | 300 |
| | Cross-sectional shape | | Partial wedge shape | Partial wedge shape | Partial wedge shape |
| | Maximum thickness (μm) | | 490 | 700 | 520 |
| | Minimum thickness (μm) | | 320 | 350 | 350 |
| Sound insulation layer | Thermoplastic resin | Type | PVB2 | PVB2 | PVB2 |
| | | Amount (parts by mass) | 100 | 100 | 100 |
| | Plasticizer | Type | 3GO | 3GO | 3GO |
| | | Amount (parts by mass) | 60 | 60 | 60 |

TABLE 4-continued

|  |  |  | Example 10 | Example 11 | Comparative Example 3 |
|---|---|---|---|---|---|
| Colored layer | | Cross-sectional shape | Wedge shape | Wedge shape | Wedge shape |
| | | Maximum thickness (μm) | 150 | 225 | 150 |
| | | Minimum thickness (μm) | 100 | 100 | 100 |
| | Thermoplastic resin | Type | PVB1 | PVB1 | PVB1 |
| | | Amount (parts by mass) | 100 | 100 | 100 |
| | Colorant | Type | SG-5A1251 | SG-8E905 | SG-8E905 |
| | | Amount (parts by mass) | 2 | 2 | 2 |
| | Plasticizer | Type | 3GO | 3GO | 3GO |
| | | Amount (parts by mass) | 36 | 36 | 36 |
| Outer layer (protective layer) 2 | | Cross-sectional shape | Wedge shape | Wedge shape | Wedge shape |
| | | Length of colored layer in width direction (cm) | 20 | 20 | 20 |
| | | Maximum thickness (μm) | 430 | 400 | 400 |
| | | Minimum thickness (μm) | 0 | 0 | 0 |
| | Thermoplastic resin | Type | PVB1 | PVB1 | PVB1 |
| | | Amount (parts by mass) | 100 | 100 | 100 |
| | Plasticizer | Type | 3GO | 3GO | 3GO |
| | | Amount (parts by mass) | 40 | 40 | 40 |
| | | Roughness Rz of surface having recesses (μm) | 31 | 26 | 43 |
| | | Interval Sm of recesses (μm) | 210 | 205 | 400 |
| | | Cross-sectional shape | Partial wedge shape | Partial wedge shape | Partial wedge shape |
| | | Maximum thickness (μm) | 490 | 700 | 490 |
| | | Minimum thickness (μm) | 320 | 350 | 130 |
| Film end portion (transparent side) | Thickness of protective layer 1 (μm) | | 350 | 350 | 350 |
| | Thickness of sound insulation layer (μm) | | 100 | 100 | 100 |
| | Thickness of colored layer (μm) | | 0 | 0 | 0 |
| | Thickness of protective layer 2 (μm) | | 350 | 350 | 350 |
| Film end portion (colored side) | Thickness of protective layer 1 (μm) | | 320 | 590 | 520 |
| | Thickness of sound insulation layer (μm) | | 150 | 225 | 150 |
| | Thickness of colored layer (μm) | | 430 | 400 | 400 |
| | Thickness of protective layer 2 (μm) | | 320 | 585 | 130 |
| Whole interlayer film | Arrangement | | Protective layer 1/sound insulation layer/colored layer/protective layer 2 | Protective layer 1/sound insulation layer/colored layer/protective layer 2 | Protective layer 1/sound insulation layer/colored layer/protective layer 2 |
| | Cross-sectional shape | | Wedge shape | Wedge shape | Wedge shape |
| | Wedge angle θ [mrad] | | 0.4 | 1.0 | 0.4 |
| | Maximum thickness (μm) | | 1200 | 1800 | 1200 |
| | Minimum thickness (μm) | | 800 | 800 | 800 |
| Minimum distance between surface of colored layer and surface of outer layer (protective layer) 1 having recesses (μm) | | | 470 | 715 | 670 |
| Minimum distance between surface of colored layer and surface of outer layer (protective layer) 2 having recesses (μm) | | | 320 | 585 | 130 |
| Evaluation | Evaluation on appearance by visual observation | | ○ | ○ | X |
| | Visible light transmittance (%) | | 7.2 | 8.8 | 9.2 |

INDUSTRIAL APPLICABILITY

The present invention can provide an interlayer film for a laminated glass which includes two or more stacked resin layers including a colored layer, exhibits excellent deaeration properties in a production process of a laminated glass, and is capable of preventing poor appearance of a colored portion, and a laminated glass including the interlayer film for a laminated glass.

REFERENCE SIGNS LIST

1 Arbitrarily selected one recess
2 Recess adjacent to arbitrarily selected one recess
3 Recess adjacent to arbitrarily selected one recess
A Interval between recess 1 and recess 2
B Interval between recess 1 and recess 3
4 Laminated glass for vehicle
41 Colored layer disposed in belt-like shape along upper portion
51 Interlayer film for a laminated glass
511 Colored layer whose cross section is rectangular
512 Outer layer having large number of recesses on one surface
a Minimum distance between outer layer side surface of colored layer and surface having large number of recesses of outer layer
52 Interlayer film for a laminated glass
521 Colored layer whose cross section is wedge shaped

522 Outer layer having large number of recesses on one surface
b Minimum distance between outer layer side surface of colored layer and surface having large number of recesses of outer layer
6 Interlayer film for a laminated glass
61 Outer layer (first protective layer) having large number of recesses on one surface
62 Sound insulation layer
63 Colored layer
64 Second protective layer

The invention claimed is:

1. An interlayer film for a laminated glass, having a laminated structure including four or more layers, at least comprising:
    an outer layer disposed on the outermost surface of the interlayer film for a laminated glass and having a number of recesses on one surface; and
    a colored layer containing a colorant,
    wherein a minimum distance between an outer layer side surface of the colored layer and the surface having a number of recesses of the outer layer is 150 μm or longer.

2. The interlayer film for a laminated glass according to claim 1, wherein the surface having a number of recesses of the outer layer has a ten-point average roughness Rz measured in conformity with JIS B 0601 (1994) of 15 to 60 μm.

3. The interlayer film for a laminated glass according to claim 1, which has a quadruple layer structure including the outer layer, which is a first protective layer, having a number of recesses on one surface, a sound insulation layer, the colored layer, and a second protective layer stacked in the stated order.

4. A laminated glass comprising:
    a pair of glass plates; and
    the interlayer film for a laminated glass according to claim 1 interposed between the glass plates.

5. A laminated glass comprising:
    a pair of glass plates; and
    the interlayer film for a laminated glass according to claim 2 interposed between the glass plates.

6. A laminated glass comprising:
    a pair of glass plates; and
    the interlayer film for a laminated glass according to claim 3 interposed between the glass plates.

7. The interlayer film for a laminated glass according to claim 3, wherein a thickness of the first protective layer is 400 μm or more.

* * * * *